US010997528B2

(12) United States Patent
Lin (10) Patent No.: US 10,997,528 B2
(45) Date of Patent: May 4, 2021

(54) UNSUPERVISED MODEL EVALUATION METHOD, APPARATUS, SERVER, AND COMPUTER-READABLE STORAGE MEDIUM

(71) Applicant: Advanced New Technologies Co., Ltd., Grand Cayman (KY)

(72) Inventor: Jianbin Lin, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 17/086,120

(22) Filed: Oct. 30, 2020

(65) Prior Publication Data

US 2021/0049513 A1 Feb. 18, 2021

Related U.S. Application Data

(63) Continuation of application No. PCT/CN2019/099668, filed on Aug. 7, 2019.

(30) Foreign Application Priority Data

Sep. 20, 2018 (CN) .......................... 201811101769.7

(51) Int. Cl.
*G06N 20/00* (2019.01)

(52) U.S. Cl.
CPC .................................... *G06N 20/00* (2019.01)

(58) Field of Classification Search
CPC combination set(s) only.
See application file for complete search history.

(56) References Cited

U.S. PATENT DOCUMENTS 5,317,507 A * 5/1994 Gallant ................. G06F 16/355
715/260
5,325,298 A * 6/1994 Gallant ................. G06F 16/355
704/9

(Continued)

FOREIGN PATENT DOCUMENTS

| CN | 106294621 | 1/2017 |
| CN | 107291803 | 10/2017 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Michael B Holmes
(74) *Attorney, Agent, or Firm* — Fish & Richardson P.C.

(57) ABSTRACT

An unsupervised model evaluation computer-implemented method, medium, and system are disclosed. In one computer-implemented method, S node vectors corresponding to S nodes from N node vectors obtained by using an unsupervised model are determined, where both N and S are positive integers. A neighboring node and a non-neighboring node of each of the S nodes is determined. Based on a node vector of a first S node and the neighboring node, a similarity between the first S node and the neighboring node as a positive sample predicted value is determined. Based on the node vector of the first S node and the non-neighboring node, a similarity between the first S node and the non-neighboring node as a negative sample predicted value is determined. The unsupervised model is evaluated based on the positive sample predicted value and the negative sample predicted value.

20 Claims, 3 Drawing Sheets

(56) References Cited

U.S. PATENT DOCUMENTS

| | | | | |
|---|---|---|---|---|
| 5,396,625 | A * | 3/1995 | Parkes | G06T 9/008 |
| 6,360,227 | B1 * | 3/2002 | Aggarwal | G06F 16/954 |
| 7,330,440 | B1 * | 2/2008 | Bryant | H04L 45/00 |
| | | | | 370/254 |
| 7,389,225 | B1 * | 6/2008 | Jensen | G06F 40/30 |
| | | | | 704/9 |
| 7,702,509 | B2 | 4/2010 | Bellegarda | |
| 7,881,223 | B2 * | 2/2011 | Shim | H04L 45/22 |
| | | | | 370/254 |
| 7,881,474 | B2 * | 2/2011 | Sun | H04W 12/04033 |
| | | | | 380/270 |
| 8,441,919 | B2 * | 5/2013 | Vasseur | H04L 12/66 |
| | | | | 370/216 |
| 8,750,163 | B2 * | 6/2014 | Awano | H04L 45/745 |
| | | | | 370/254 |
| 9,912,523 | B2 | 3/2018 | Shivashankar et al. | |
| 2014/0025689 | A1 | 1/2014 | Kang et al. | |

FOREIGN PATENT DOCUMENTS

| | | |
|---|---|---|
| CN | 107909119 | 4/2018 |
| CN | 108536784 | 9/2018 |
| CN | 109615080 | 4/2019 |
| TW | 201202876 | 1/2012 |
| TW | 201705034 | 2/2017 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2019/099668, dated Oct. 29, 2019, 11 pages (with partial English translation).

* cited by examiner

UNSUPERVISED MODEL EVALUATION METHOD, APPARATUS, SERVER, AND COMPUTER-READABLE STORAGE MEDIUM

CROSS-REFERENCE TO RELATED APPLICATIONS

This application is a continuation of PCT Application No. PCT/CN2019/099668, filed on Aug. 7, 2019, which claims priority to Chinese Patent Application No. 201811101769.7, filed on Sep. 20, 2018, and each application is hereby incorporated by reference in its entirety.

TECHNICAL FIELD

The present specification relates to the field of computer technologies, and in particular, to unsupervised model evaluation methods, apparatuses, servers, and computer-readable storage media.

BACKGROUND

With continuous development of science and technologies, unsupervised learning algorithms are widely applied. Unsupervised learning models can calculate graph data, and map each node in the graph data to one vector space to obtain a calculated node vector. Supervised algorithms are generally used to evaluate calculated node vectors, and then train a machine learning model. However, training of a machine learning model needs more data and time.

SUMMARY

Embodiments of the present specification provide unsupervised model evaluation methods, apparatuses, servers, and computer-readable storage media.

According to a first aspect, some embodiments of the present specification provide an unsupervised model evaluation method, including: determining S node vectors corresponding to S nodes from N node vectors obtained by using an unsupervised model; determining a neighboring node and a non-neighboring node of each of the S nodes; determining, based on a node vector of each node and a node vector of the neighboring node of each node, a similarity between each node and the neighboring node of each node as a positive sample predicted value; determining, based on the node vector of each node and a node vector of the non-neighboring node of each node, a similarity between each node and the non-neighboring node of each node as a negative sample predicted value; and evaluating the unsupervised model based on the positive sample predicted value and the negative sample predicted value.

According to a second aspect, some embodiments of the present specification provide an unsupervised model evaluation apparatus, including: a first determining module, configured to determine S node vectors corresponding to S nodes from N node vectors obtained by using an unsupervised model, where both N and S are positive integers, and N is greater than or equal to S; a second determining module, configured to determine a neighboring node and a non-neighboring node of each of the S nodes; a positive sample predicted value determining module, configured to determine, based on a node vector of each node and a node vector of the neighboring node of each node, a similarity between each node and the neighboring node of each node as a positive sample predicted value; a negative sample predicted value determining module, configured to determine, based on the node vector of each node and a node vector of the non-neighboring node of each node, a similarity between each node and the non-neighboring node of each node as a negative sample predicted value; and an evaluation module, configured to evaluate the unsupervised model based on the positive sample predicted value and the negative sample predicted value.

According to a third aspect, some embodiments of the present specification provide a server, including a memory, a processor, and a computer program that is stored in the memory and that can run on the processor, where the processor performs steps of the method according to any of the previous embodiments.

According to a fourth aspect, some embodiments of the present specification provide a computer-readable storage medium, where the computer-readable storage medium stores a computer program, and when executed by a processor, the program implements steps of the method according to any of the previous embodiments.

Some embodiments of the present specification bring the following beneficial effects:

In the unsupervised model evaluation method provided in some embodiments of the present specification, S node vectors corresponding to S nodes are determined from N node vectors obtained by using an unsupervised model, where both N and S are positive integers; a neighboring node and anon-neighboring node of each of the S nodes are determined; a similarity between each node and the neighboring node of each node is determined as a positive sample predicted value based on a node vector of each node and a node vector of the neighboring node of each node; a similarity between each node and the non-neighboring node of each node is determined as a negative sample predicted value based on the node vector of each node and a node vector of the non-neighboring node of each node; and the unsupervised model is evaluated based on the positive sample predicted value and the negative sample predicted value. In the solutions in some embodiments of the present specification, the similarity between each node and the neighboring node is determined as a positive sample; a similarity between each node and the non-neighboring node is determined as a negative sample; and an effect of the unsupervised model is determined based on the positive sample and the negative sample. No additional model training is needed, so that an unsupervised model evaluation process is more easily implemented.

BRIEF DESCRIPTION OF DRAWINGS

By reading the detailed descriptions of the following preferred implementations, various other advantages and benefits are clearly understood by a person of ordinary skill in the art. The accompanying drawings are merely used to illustrate purposes of preferred implementations, and are not considered as limitations on the present specification. In addition, the same reference symbols are used to represent the same components throughout the drawings. In the accompanying drawings.

DESCRIPTION OF EMBODIMENTS

For better understanding of the previous technical solutions, the following describes in detail the technical solutions in some embodiments of the present specification by using the accompanying drawings and specific embodiments. It should be understood that, some embodiments of the present specification and specific features in some embodiments are detailed descriptions of the technical solutions in some embodiments of the present specification, but not limitations on the technical solutions in the present specification. Some embodiments of the present specification and the technical features in some embodiments can be mutually combined provided that no conflict occurs.

Figure 1:
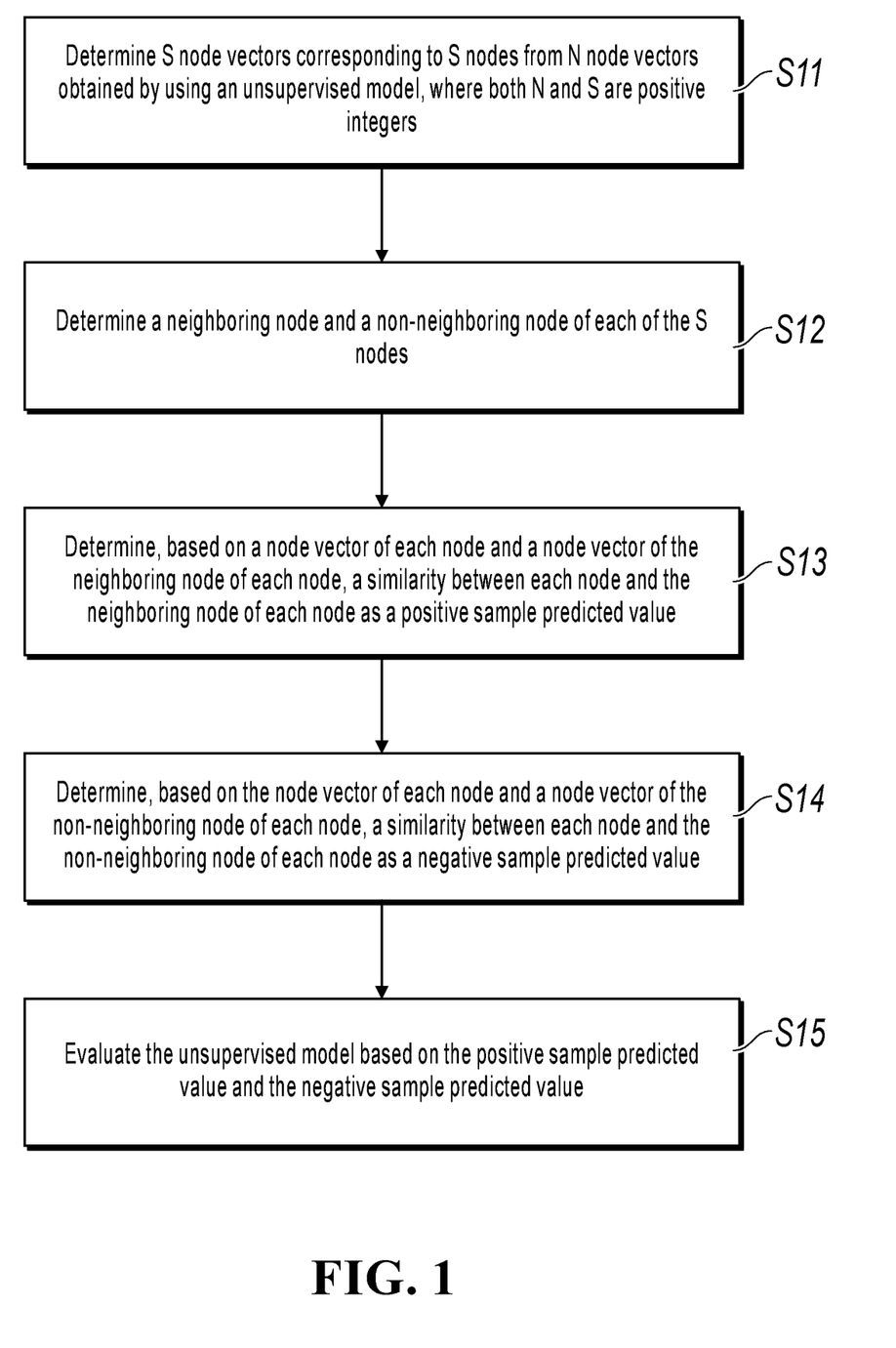
FIG. 1 is a flowchart illustrating an unsupervised model evaluation method, according to a first aspect of some embodiments of the present specification.

According to a first aspect, some embodiments of the present specification provide an unsupervised model evaluation method. FIG. 1 is a flowchart illustrating an unsupervised model evaluation method, according to some embodiments of the present specification. The method includes the following steps:

Step S11: Determine S node vectors corresponding to S nodes from N node vectors obtained by using an unsupervised model, where both N and S are positive integers.

In some embodiments of the present specification, the N node vectors can be obtained by the unsupervised model by calculating N pieces of input data. The N pieces of input data can be considered as N nodes. The input data can be determined based on an actual situation. In some embodiments, the input data can be a quantity of vectors used to represent words, each word can be considered as a node, and each word can be represented by an initial vector. An initial vector of a word is used as an input of the unsupervised model, and an embedding (embedded vector) corresponding to each node, that is, an output node vector, is output through calculation of the unsupervised model. It should be understood that the embedding can be considered as mapping a node from an original space to another space, and maintaining, in the another space, structural information and distance information of the node in the original space.

The unsupervised model can be selected based on actual needs. In some embodiments, the unsupervised model can be a Word2Vec model. During word processing, each word is mapped to a low-dimensional vector space by using the Word2Vec model, to obtain a node vector corresponding to each word node.

It should be understood that, in a calculation process of the unsupervised model, the last output node vector can be determined by a loss function, for example, a noise contrastive estimation (NCE) loss function. A vector of a node obtained by using the NCE loss function enables the node to be characterized by a shorter distance to its neighboring node and a longer distance to its non-neighboring node in a vector space.

During determining of the S nodes, S different nodes can be selected from the N nodes, or S nodes can be randomly selected from the N nodes. The S nodes can be selected at a time, or selected at multiple times. No limitation is imposed here.

Step S12: Determine a neighboring node and a non-neighboring node of each of the S nodes.

In some embodiments of the present specification, each of the S nodes can include multiple neighboring nodes and multiple non-neighboring nodes. Any quantity of neighboring nodes can be randomly selected from the multiple neighboring nodes and any quantity of non-neighboring nodes can be randomly selected from the multiple non-neighboring nodes. Or, a quantity of selected neighboring nodes and a quantity of selected non-neighboring nodes can be set. No limitation is imposed here.

A neighboring node of a node can be generated based on a predetermined neighboring node generation rule. Or, a graph can be formed by the N nodes based on relationships between nodes, and a neighboring node can be selected from the formed graph. In some embodiments, edges can be connected based on the relationships between the nodes, to form a graph structure that includes connection relationships between the nodes. A neighboring node and a non-neighboring node of each of the S nodes can be identified in the graph structure. In other embodiments, a neighboring node of each node can be generated based on a predetermined neighbor generation algorithm. Certainly, the neighboring node can further be determined in other ways. No limitation is imposed in some embodiments of the present specification. Determining a non-neighboring node is similar to determining a neighboring node, and details are omitted here for simplicity.

Step S13: Determine, based on a node vector of each node and a node vector of the neighboring node of each node, a similarity between each node and the neighboring node of each node as a positive sample predicted value.

Step S14: Determine, based on the node vector of each node and a node vector of the non-neighboring node of each node, a similarity between each node and the non-neighboring node of each node as a negative sample predicted value.

In some embodiments of the present specification, after the neighboring node and the non-neighboring node of each node are determined, the neighboring node can be used as a positive sample, and the non-neighboring node can be used as a negative sample. For each node, a similarity between the node and each neighboring node is separately calculated as a neighboring node predicted value, and a similarity between the node and each non-neighboring node is separately calculated as a non-neighboring node predicted value. A selection can be made based on actual needs for similarity calculation. In some embodiments, an inner product between vectors can be calculated and normalized to obtain the similarity.

It should be understood that the similarity can be a number between 0 and 1. A similarity between two nodes closer to 1 indicates a higher probability that the two nodes are neighbors of each other.

Step S15: Evaluate the unsupervised model based on the positive sample predicted value and the negative sample predicted value.

In some embodiments of the present specification, a neighboring node predicted value closer to 1 and a non-neighboring node predicted value closer to 0 indicate a better effect of the unsupervised model. Conversely, a neighboring node (positive sample) predicted value closer to 0 and a non-neighboring node (negative sample) predicted value closer to 1 indicate a worse effect of the unsupervised model. Therefore, the unsupervised model can be evaluated by using the positive sample predicted value and the negative sample predicted value. Such a method is more general and easier to implement.

Optionally, the determining S node vectors corresponding to S nodes from N node vectors obtained by using an unsupervised model includes: determining a node set, where the node set includes N nodes, and the N nodes correspond to the N node vectors; and randomly selecting one node from the node set as a sampling node, and performing selections for a total of S times to obtain the S nodes.

In some embodiments of the present specification, the N nodes corresponding to the N node vectors obtained through calculation by the unsupervised model can form the node set. During selection of the S nodes, selections can be performed for a total of S times from the node set in bagging mode, and one node is randomly selected from the N nodes as a sampling node each time.

Optionally, the determining a neighboring node and a non-neighboring node of each of the S nodes includes: performing the following steps for each of the S nodes: determining a neighboring node set and a non-neighboring node set of the node from N nodes based on a predetermined neighbor generation algorithm; determining one or more neighboring nodes from the neighboring node set; and determining one or more non-neighboring nodes from the non-neighboring node set.

In some embodiments of the present specification, for each of the S nodes, a neighboring node of the node can be obtained by using a predetermined neighbor generation algorithm. The predetermined neighbor generation algorithm can be selected based on actual needs, such as a first-order nearest neighbor algorithm or a random walk neighbor algorithm. In some embodiments, to ensure that a generated neighboring node can be consistent with a node relationship used in an unsupervised model calculation process, the predetermined neighbor generation algorithm is the same as a neighbor generation algorithm used in the unsupervised model calculation process.

In some embodiments, when a neighboring node set of a node is generated by using a predetermined neighbor generation algorithm, a non-neighboring node can be obtained by subtracting the neighboring node set from the node set. It should be understood that, for each node, a quantity of elements included in a corresponding neighboring node set may differ. For example, a first node has five neighboring nodes, and a second node has eight neighboring nodes. During neighboring node selection, a quantity of neighboring nodes can be fixed or random.

The first node and the second node above are still used as an example. In some embodiments, the same quantity of neighboring nodes are selected for each node, for example, one neighboring node is selected for both nodes separately. In this case, one neighboring node can be randomly selected from the five neighboring nodes of the first node, and one neighboring node can be randomly selected from the eight neighboring nodes of the second node. In other embodiments, a quantity of neighboring nodes is randomly determined for each node. For example, two neighboring nodes are randomly selected from the five neighboring nodes of the first node, and three neighboring nodes are randomly selected from the eight neighboring nodes of the second node, etc. Certainly, for each node, regardless of a method for determining a neighboring node, a quantity of determined neighboring nodes is less than or equal to a total quantity of neighboring nodes actually corresponding to the node.

A method for determining a non-neighboring node corresponding to each node is similar to the previous method for determining a neighboring node. A quantity of non-neighboring nodes can be set based on actual needs. In some embodiments, 4 to 20 nodes can be randomly selected from each non-neighboring node set as non-neighboring nodes of the node. For the method for determining a non-neighboring node, reference can be made to the previous description about determining a neighboring node. Details are omitted here for simplicity.

In some embodiments, the evaluating the unsupervised model based on the positive sample predicted value and the negative sample predicted value includes: constructing a first-type 2-tuple sample based on the positive sample predicted value and a positive sample label value; constructing a second-type 2-tuple sample based on the negative sample predicted value and a negative sample label value; and evaluating the unsupervised model based on the first-type 2-tuple sample and the second-type 2-tuple sample.

In some embodiments of the present specification, a verification set can be constructed and used to determine an unsupervised model evaluation effect. In some embodiments, the verification set can be initially set to a null set. After 2-tuple samples are constructed based on positive and negative samples, the 2-tuple samples are added to the initial null set to obtain a final verification set.

In some embodiments of the present specification, a positive sample label value and a negative sample label value can be set, to distinguish between a neighboring node and a non-neighboring node. In some embodiments, the positive sample label value is set to 1, and the negative sample label value is set to 0. Therefore, for a neighboring node of a node, a first-type 2-tuple sample can be determined based on a positive sample predicted value and a positive sample label value of the neighboring node. For example, if the positive sample predicted value of the neighboring node is 0.9, a corresponding first-type 2-tuple sample is (1, 0.9). For a non-neighboring node of a node, a second-type 2-tuple sample can be determined based on a negative sample predicted value and a negative sample label value of the non-neighboring node. For example, if the negative sample predicted value of the non-neighboring node is 0.3, a corresponding second-type 2-tuple sample is (0, 0.3).

Figure 2:
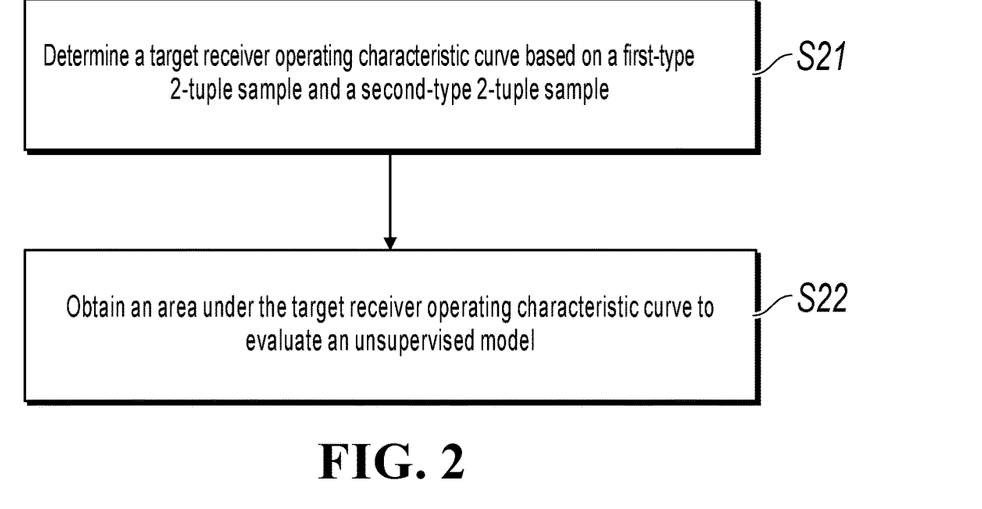
FIG. 2 is a flowchart illustrating an unsupervised model evaluation method performed based on 2-tuple samples, according to some embodiments of the present specification.

The unsupervised model can be evaluated based on the previous constructed verification set. FIG. 2 is a flowchart illustrating an unsupervised model evaluation method performed based on a first-type 2-tuple sample and a second-type 2-tuple sample, according to some embodiments of the present specification. The method includes the following steps:

Step S21: Determine a target receiver operating characteristic curve based on the first-type 2-tuple sample and the second-type 2-tuple sample.

Step S22: Obtain an area under the target receiver operating characteristic curve to evaluate the unsupervised model.

In some embodiments, binary classification can be performed on a verification set including the first-type 2-tuple sample and the second-type 2-tuple sample, and the area under the target receiver operating characteristic curve can be determined to evaluate performance of the binary classification.

It should be understood that, in some embodiments, a predicted value can be used to indicate a probability that two nodes are neighboring nodes of each other. When a target receiver operating characteristic (ROC) curve is drawn, a positive sample predicted value and a negative sample predicted value can be sorted based on their sizes. Binary classification can be performed on sorted samples by selecting different thresholds. To be specific, a 2-tuple sample whose predicted value is greater than or equal to a threshold is predicted as a positive sample, and a 2-tuple sample whose predicted value is less than the threshold is predicted as a negative sample. Then, a true positive rate (TPR) and a false positive rate (FPR) at the threshold are calculated based on label values actually corresponding to the 2-tuple samples.

The following four cases are involved during calculation of the TPR and FPR: true positive (TP), false positive (FP), false negative (FN), and true negative (TN). TP indicates that a prediction is a positive sample, and the prediction is correct. FP indicates that a prediction is a positive sample, but the prediction is incorrect. FN indicates that a prediction is a negative sample, but the prediction is incorrect. TN indicates that a prediction is a negative sample, and the prediction is correct. Using the previous 2-tuple samples as an example, if a predicted value of a 2-tuple sample is greater than or equal to a threshold, it indicates that the 2-tuple sample is predicted as a positive sample. Then, a label value of the 2-tuple sample is checked. If the label value is a positive sample label value, it indicates that the 2-tuple sample is TP, or if the label value is a negative sample label value, it indicates that the 2-tuple sample is FP. If a predicted value of a 2-tuple sample is less than a threshold, it indicates that the 2-tuple sample is predicted as a negative sample. Then, a label value of the 2-tuple sample is checked. If the label value is a positive sample label value, the 2-tuple sample is FN, or if the label value is a negative sample label value, the 2-tuple sample is TN.

The TPR is calculated as follows: TPR=TP/(TP+FN). The FPR is calculated as follows: FPR=FP/(TN+FP). The TPR represents a possibility that a prediction is a positive sample and the prediction is correct, and the FPR represents a possibility that a prediction is a positive sample but the prediction is incorrect.

The TPR is used as a vertical axis, and the FPR is used as a horizontal axis to obtain coordinates that form a ROC curve. In some embodiments, a predicted value of each 2-tuple sample can be used as a threshold to calculate a TPR and a FPR at the threshold. For example, if a quantity of 2-tuple samples is M, there are M corresponding predicted values. The M predicted values are sorted by size, and each predicted value is used as a threshold. When a predicted value of a 2-tuple sample is greater than or equal to the threshold, the 2-tuple sample is predicted as a positive sample. When the predicted value of the 2-tuple sample is less than the threshold, the 2-tuple sample is predicted as a negative sample. Each time one threshold is selected, one group of TPR and FPR, that is, one point on a ROC curve, can be obtained. In some embodiments, a total of M groups of TPRs and FPR are obtained, and the ROC curve can be drawn based on the M points.

An area under ROC curve (AUC curve) is an area under the ROC curve, and can reflect a classification capability expressed by the ROC curve. Generally, a greater AUC value indicates a better classification effect. Therefore, the AUC value can be used to evaluate the effect of the unsupervised model. It can be understood that, in addition to using the AUC value to evaluate the effect of the unsupervised model, other methods such as an F1 value can be used. No limitation is imposed here.

For better understanding of the unsupervised model evaluation method provided in some embodiments of the present specification, the following uses a node vector obtained by using the unsupervised model as an example to describe the unsupervised model evaluation method provided in some embodiments of the present specification. In some embodiments, a node set obtained through calculation by the unsupervised model is V, a node vector set corresponding to the node set is E, a quantity of sampled nodes is S, a verification set T is initially a null set, and for each of the S nodes, one neighboring node and N non-neighboring nodes are determined to construct a target verification set.

Step 1: Obtain the node set V, the node vector set E, the target verification set T=Ø, and the quantity of sampled nodes S.

Step 2: Set a quantity of iterations i, which ranges from 1 to S, and perform the following steps during each iteration: $v_i$ randomly sampling a node (denoted as $v_i$) from the set V; generating a neighboring node set and a non-neighboring node set of $v_i$ based on a predetermined neighbor generation algorithm, and randomly sampling one neighboring node (denoted as $p_i$) from the neighboring node set; identifying a vector of $v_i$ and a vector of $p_i$ from the set E, and calculating a similarity $sam_{vp}$ between the two vectors; constructing a 2-tuple sample (1, $sam_{vp}$), and adding it to the verification set T; randomly sampling N non-neighboring nodes (denoted as a set) from the non-neighboring node set; identifying the vector of the node $v_i$ and a vector of each node in $N_i$ from the set E, calculating a similarity between the vector of $v_i$ and the vector of each node in $N_i$, and denoting the N obtained similarities as a set $sam_{vn}$; for each element $sam_{vnj}$ in the set $sam_{vn}$, constructing N 2-tuples (0, $sam_{vnj}$), and adding the 2-tuples to the verification set T, where a value of j ranges from 1 to N.

Step 3: Use a binary classification indicator such as an AUC value or an F1 value to evaluate the set T as each 2-tuple in the set T can be considered as including a label value and a predicted value, where an evaluation result can be used as an indicator for measuring a learning effect of the unsupervised model.

Figure 3:
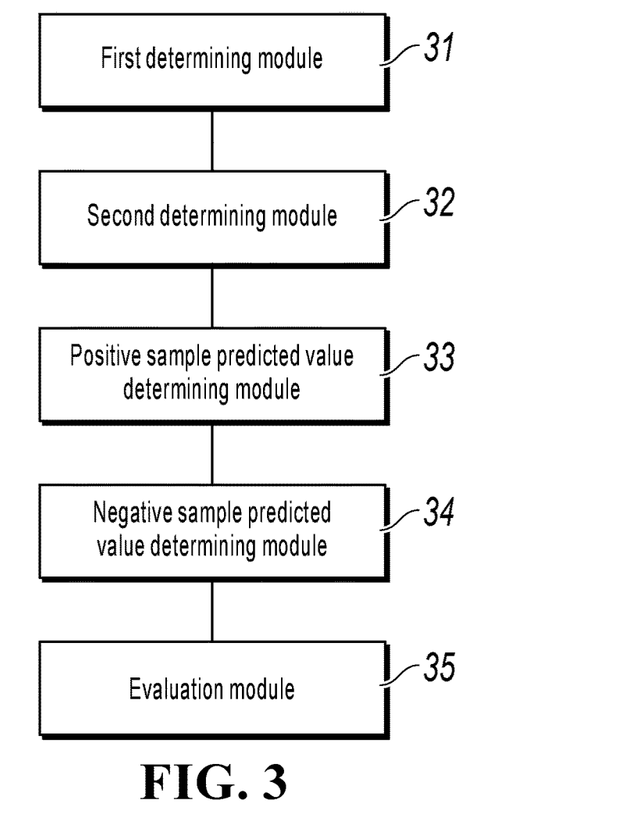
FIG. 3 is a schematic diagram illustrating an unsupervised model evaluation apparatus, according to a second aspect of some embodiments of the present specification.

According to a second aspect, based on the same inventive concept, some embodiments of the present specification provide an unsupervised model evaluation apparatus, as shown in FIG. 3, including: a first determining module 31, configured to determine S node vectors corresponding to S nodes from N node vectors obtained by using an unsupervised model, where both N and S are positive integers; a second determining module 32, configured to determine a neighboring node and a non-neighboring node of each of the S nodes; a positive sample predicted value determining module 33, configured to determine, based on a node vector of each node and a node vector of the neighboring node of each node, a similarity between each node and the neighboring node of each node as a positive sample predicted value; a negative sample predicted value determining module 34, configured to determine, based on the node vector of each node and a node vector of the non-neighboring node of each node, a similarity between each node and the non-neighboring node of each node as a negative sample predicted value; and an evaluation module 35, configured to evaluate the unsupervised model based on the positive sample predicted value and the negative sample predicted value.

In some optional implementations, the evaluation module 35 is configured to: construct a first-type 2-tuple sample based on the positive sample predicted value and a positive sample label value; construct a second-type 2-tuple sample based on the negative sample predicted value and a negative sample label value; and evaluate the unsupervised model based on the first-type 2-tuple sample and the second-type 2-tuple sample.

In some optional implementations, the evaluation module 35 is configured to: determine a target receiver operating characteristic curve based on the first-type 2-tuple sample and the second-type 2-tuple sample; and obtain an area under the target receiver operating characteristic curve to evaluate the unsupervised model.

In some optional implementations, the second determining module 32 is configured to: perform the following steps for each of the S nodes: determine a neighboring node set and a non-neighboring node set of the node from N nodes based on a predetermined neighbor generation algorithm; determine one or more neighboring nodes from the neighboring node set; and determine one or more non-neighboring nodes from the non-neighboring node set.

In some optional implementations, the first determining module 31 is configured to: determine a node set, where the node set includes N nodes, and the N nodes correspond to the N node vectors; and a sampling node acquisition module, configured to randomly select one node from the node set as a sampling node, and perform selections for a total of S times to obtain the S nodes.

For the previous apparatus, specific functions of modules in the apparatus are described in detail in some embodiments of the unsupervised model evaluation method provided in some embodiments of the present specification, and details are omitted here for simplicity.

Figure 4:
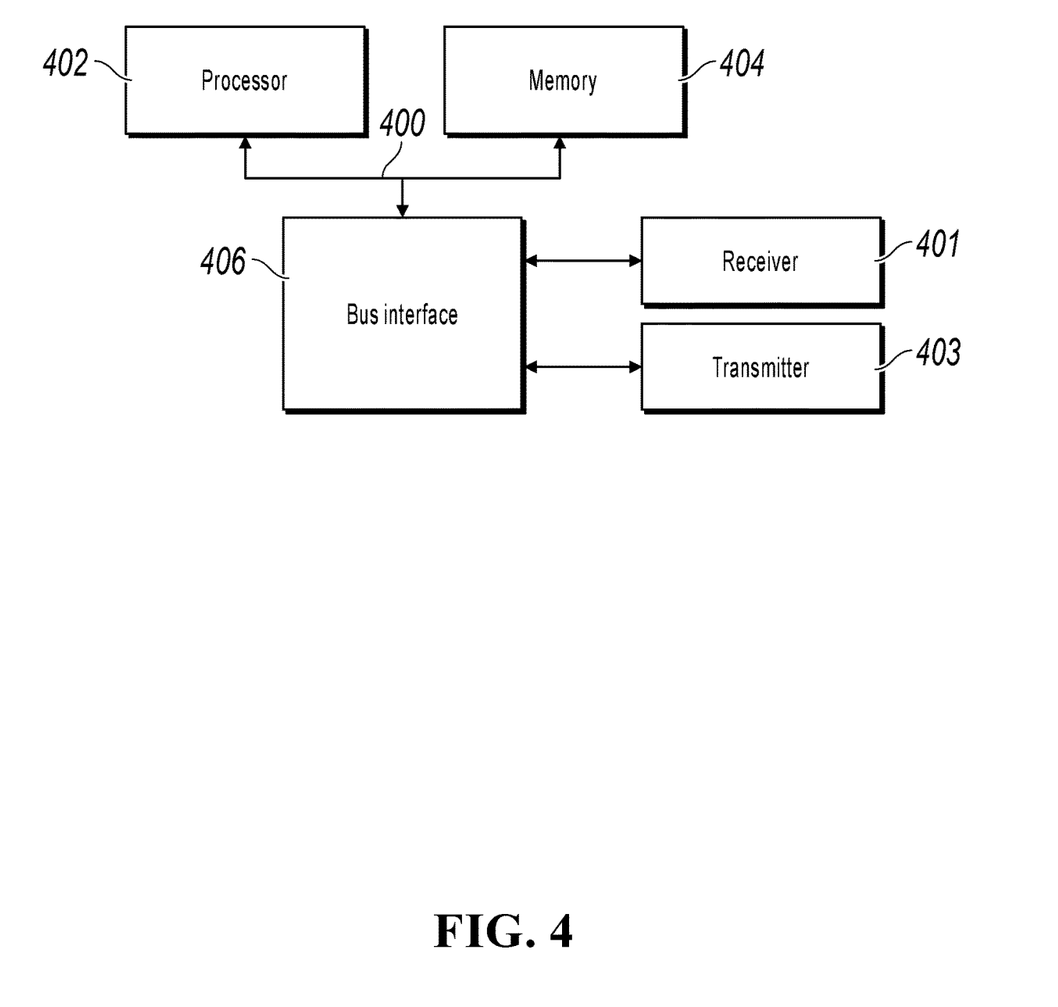
FIG. 4 is a schematic diagram illustrating a server, according to a third aspect of some embodiments of the present specification.

According to a third aspect, based on the same inventive concept as the unsupervised model evaluation methods in the previous embodiments, the present specification further provides a server. As shown in FIG. 4, the server includes a memory 404, a processor 402, and a computer program that is stored in the memory 404 and that can run on the processor 402. When executing the program, the processor 402 implements steps of any of the previous unsupervised model evaluation methods.

In FIG. 4, for a bus architecture (indicated by using a bus 400), the bus 400 can include any quantity of interconnected buses and bridges, and the bus 400 interconnects various circuits including one or more processors represented by the processor 402 and one or more memories represented by the memory 404. The bus 400 can further link various other circuits such as a peripheral device, a voltage regulator, and a power management circuit, which are well known in the art and therefore are not further described in the present specification. A bus interface 406 provides an interface between the bus 400 and a receiver 401, and an interface between the bus 400 and a transmitter 403. The receiver 401 and the transmitter 403 can be the same component, that is, a transceiver, which provides a unit configured to communicate with various other apparatuses on a transmission medium. The processor 402 is responsible for management of the bus 400 and general processing, and the memory 404 can be configured to store data used when the processor 402 performs operations.

According to a fourth aspect, based on the same inventive concept as the unsupervised model evaluation methods in the previous embodiments, the present specification further provides a computer-readable storage medium, where the computer-readable storage medium stores a computer program, and when executed by a processor, the program implements steps of any of the previous unsupervised model evaluation methods.

The present specification is described with reference to the flowcharts and/or block diagrams of the methods, the devices (systems), and the computer program products based on some embodiments of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of any other programmable data processing device to generate a machine, so that the instructions executed by a computer or a processor of any other programmable data processing device generate a device for implementing a specific function in one or more processes in the flowcharts and/or in one or more blocks in the block diagrams.

These computer program instructions can be stored in a computer readable memory that can instruct the computer or any other programmable data processing device to work in a specific way, so that the instructions stored in the computer readable memory generate an artifact that includes an instruction device. The instruction device implements a specific function in one or more processes in the flowcharts and/or in one or more blocks in the block diagrams.

These computer program instructions can be loaded onto the computer or another programmable data processing device, so a series of operations and operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present specification have been described, a person skilled in the art can make changes and modifications to these embodiments once they understand the basic inventive concept. Therefore, the following claims are intended to be construed as to cover the preferred embodiments and all changes and modifications falling within the scope of the present specification.

Obviously, a person skilled in the art can make various modifications and variations to the present specification without departing from the spirit and scope of the present specification. The present specification is intended to cover these modifications and variations provided that they fall within the scope of protection defined by the following claims and their equivalent technologies.

What is claimed is:

1. A computer-implemented method for unsupervised model evaluation, comprising:
determining S node vectors corresponding to S nodes from N node vectors obtained by using an unsupervised model, wherein both N and S are positive integers;
determining a neighboring node and a non-neighboring node of each of the S nodes;
determining, based on a node vector of a first S node and a node vector of the neighboring node of the first S node, a similarity between the first S node and the neighboring node of the first S node as a positive sample predicted value;
determining, based on the node vector of the first S node and a node vector of the non-neighboring node of the first S node, a similarity between the first S node and the non-neighboring node of the first S node as a negative sample predicted value; and
evaluating the unsupervised model based on the positive sample predicted value and the negative sample predicted value.

2. The computer-implemented method of claim 1, wherein the evaluating the unsupervised model based on the positive sample predicted value and the negative sample predicted value comprises:

constructing a first-type 2-tuple sample based on the positive sample predicted value and a positive sample label value;
constructing a second-type 2-tuple sample based on the negative sample predicted value and a negative sample label value; and
evaluating the unsupervised model based on the first-type 2-tuple sample and the second-type 2-tuple sample.

3. The computer-implemented method of claim 2, wherein the evaluating the unsupervised model based on the first-type 2-tuple sample and the second-type 2-tuple sample comprises:
determining a target receiver operating characteristic curve based on the first-type 2-tuple sample and the second-type 2-tuple sample; and
obtaining an area under the target receiver operating characteristic curve to evaluate the unsupervised model.

4. The computer-implemented method of claim 1, wherein the determining the neighboring node and the non-neighboring node of the first S node comprises:
determining a neighboring node set and a non-neighboring node set of the first S node from N nodes based on a predetermined neighbor generation algorithm.

5. The computer-implemented method of claim 4, further comprising:
determining one or more neighboring nodes from the neighboring node set; and
determining one or more non-neighboring nodes from the non-neighboring node set.

6. The computer-implemented method of claim 1, wherein determining the S node vectors corresponding to the S nodes from the N node vectors obtained by using the unsupervised model comprises:
determining a node set, wherein the node set comprises N nodes, wherein the N nodes correspond to the N node vectors.

7. The computer-implemented method of claim 6, further comprising:
randomly selecting one node from the node set as a sampling node, and performing selections for a total of S times to obtain the S nodes.

8. A non-transitory, computer-readable medium storing one or more instructions executable by a computer system to perform operations comprising:
determining S node vectors corresponding to S nodes from N node vectors obtained by using an unsupervised model, wherein both N and S are positive integers;
determining a neighboring node and a non-neighboring node of each of the S nodes;
determining, based on a node vector of a first S node and a node vector of the neighboring node of the first S node, a similarity between the first S node and the neighboring node of the first S node as a positive sample predicted value;
determining, based on the node vector of the first S node and a node vector of the non-neighboring node of the first S node, a similarity between the first S node and the non-neighboring node of the first S node as a negative sample predicted value; and
evaluating the unsupervised model based on the positive sample predicted value and the negative sample predicted value.

9. The non-transitory, computer-readable medium of claim 8, wherein the evaluating the unsupervised model based on the positive sample predicted value and the negative sample predicted value comprises:
constructing a first-type 2-tuple sample based on the positive sample predicted value and a positive sample label value;
constructing a second-type 2-tuple sample based on the negative sample predicted value and a negative sample label value; and
evaluating the unsupervised model based on the first-type 2-tuple sample and the second-type 2-tuple sample.

10. The non-transitory, computer-readable medium of claim 9, wherein the evaluating the unsupervised model based on the first-type 2-tuple sample and the second-type 2-tuple sample comprises:
determining a target receiver operating characteristic curve based on the first-type 2-tuple sample and the second-type 2-tuple sample; and
obtaining an area under the target receiver operating characteristic curve to evaluate the unsupervised model.

11. The non-transitory, computer-readable medium of claim 8, wherein the determining the neighboring node and the non-neighboring node of the first S node comprises:
determining a neighboring node set and a non-neighboring node set of the first S node from N nodes based on a predetermined neighbor generation algorithm.

12. The non-transitory, computer-readable medium of claim 11, further comprising:
determining one or more neighboring nodes from the neighboring node set; and
determining one or more non-neighboring nodes from the non-neighboring node set.

13. The non-transitory, computer-readable medium of claim 8, wherein determining the S node vectors corresponding to the S nodes from the N node vectors obtained by using the unsupervised model comprises:
determining a node set, wherein the node set comprises N nodes, wherein the N nodes correspond to the N node vectors.

14. The non-transitory, computer-readable medium of claim 13, further comprising:
randomly selecting one node from the node set as a sampling node, and performing selections for a total of S times to obtain the S nodes.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
determining S node vectors corresponding to S nodes from N node vectors obtained by using an unsupervised model, wherein both N and S are positive integers;
determining a neighboring node and a non-neighboring node of each of the S nodes;
determining, based on a node vector of a first S node and a node vector of the neighboring node of the first S node, a similarity between the first S node and the neighboring node of the first S node as a positive sample predicted value;
determining, based on the node vector of the first S node and a node vector of the non-neighboring node of the first S node, a similarity between the first S node and the non-neighboring node of the first S node as a negative sample predicted value; and evaluating the unsupervised model based on the positive sample predicted value and the negative sample predicted value.

16. The computer-implemented system of claim 15, wherein the evaluating the unsupervised model based on the positive sample predicted value and the negative sample predicted value comprises:
   constructing a first-type 2-tuple sample based on the positive sample predicted value and a positive sample label value;
   constructing a second-type 2-tuple sample based on the negative sample predicted value and a negative sample label value; and
   evaluating the unsupervised model based on the first-type 2-tuple sample and the second-type 2-tuple sample.

17. The computer-implemented system of claim 16, wherein the evaluating the unsupervised model based on the first-type 2-tuple sample and the second-type 2-tuple sample comprises:
   determining a target receiver operating characteristic curve based on the first-type 2-tuple sample and the second-type 2-tuple sample; and
   obtaining an area under the target receiver operating characteristic curve to evaluate the unsupervised model.

18. The computer-implemented system of claim 15, wherein the determining the neighboring node and the non-neighboring node of the first S node comprises:
   determining a neighboring node set and a non-neighboring node set of the first S node from N nodes based on a predetermined neighbor generation algorithm.

19. The computer-implemented system of claim 18, further comprising:
   determining one or more neighboring nodes from the neighboring node set; and
   determining one or more non-neighboring nodes from the non-neighboring node set.

20. The computer-implemented system of claim 15, wherein determining the S node vectors corresponding to the S nodes from the N node vectors obtained by using the unsupervised model comprises:
   determining a node set, wherein the node set comprises N nodes, wherein the N nodes correspond to the N node vectors; and
   randomly selecting one node from the node set as a sampling node, and performing selections for a total of S times to obtain the S nodes.

\* \* \* \* \*